United States Patent
Arai

(10) Patent No.: US 8,260,527 B2
(45) Date of Patent: Sep. 4, 2012

(54) CONTROL SYSTEM FOR A MOTORCYCLE

(75) Inventor: Katsuhiro Arai, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 576 days.

(21) Appl. No.: 12/550,429

(22) Filed: Aug. 31, 2009

(65) Prior Publication Data

US 2010/0057312 A1    Mar. 4, 2010

(30) Foreign Application Priority Data

Sep. 1, 2008   (JP) ................................. 2008-224007

(51) Int. Cl.
*B60T 7/12*   (2006.01)
*G05D 1/00*   (2006.01)

(52) U.S. Cl. ....... 701/104; 701/31.6; 701/100; 477/121; 477/115; 477/127; 477/906; 123/319; 123/377

(58) Field of Classification Search ................. 701/104, 701/100, 54; 477/121, 115, 127, 906; 123/319, 123/337

See application file for complete search history.

(56) References Cited

U.S. PATENT DOCUMENTS

| | | | | |
|---|---|---|---|---|
| 2,000,331 A | * | 5/1935 | Hill ................................. | 477/89 |
| 2,993,484 A | * | 7/1961 | Gallman ....................... | 123/332 |
| 4,445,474 A | * | 5/1984 | Nakao et al. .................. | 123/336 |
| 5,128,869 A | * | 7/1992 | Akishino et al. ................. | 701/97 |
| 5,233,530 A | * | 8/1993 | Shimada et al. ............... | 701/107 |
| 5,629,852 A | * | 5/1997 | Yokoyama et al. ........... | 701/101 |
| 5,947,221 A | * | 9/1999 | Taniguchi et al. ............ | 180/197 |
| 6,030,316 A | * | 2/2000 | Kadota ......................... | 477/121 |
| 6,058,346 A | * | 5/2000 | Wachi et al. .................... | 701/55 |
| 6,371,888 B1 | | 4/2002 | Watanabe | |
| 7,594,496 B2 | * | 9/2009 | Frenz et al. ............. | 123/406.23 |
| 2003/0062025 A1 | | 4/2003 | Samoto et al. | |
| 2006/0064225 A1 | | 3/2006 | Tabata et al. | |
| 2006/0287796 A1 | | 12/2006 | Matsuda et al. | |
| 2008/0022969 A1 | * | 1/2008 | Frenz et al. .................... | 123/347 |
| 2010/0057312 A1 | * | 3/2010 | Arai ................................ | 701/54 |

FOREIGN PATENT DOCUMENTS

| | | | |
|---|---|---|---|
| DE | 103 60 340 | * | 12/2003 |
| DE | 10 2004 033 081 | * | 7/2004 |
| EP | 2159400 A1 | * | 3/2010 |

(Continued)

OTHER PUBLICATIONS

System reliability models with stress covariates for changing load profiles; Hada, A.; Coit, D.; Agnello, M.; Megow, K.; Reliability and Maintainability Symposium (RAMS), 2011 Proceedings—Annual Digital Object Identifier: 10.1109/RAMS.2011.5754528 Publication Year: 2011, pp. 1-7.*

(Continued)

*Primary Examiner* — Cuong H Nguyen

(74) *Attorney, Agent, or Firm* — Keating & Bennett, LLP

(57) ABSTRACT

A control system for a vehicle includes a CPU, a throttle sensor, a shift actuator, and fuel injectors. When the CPU detects a control failure of the throttle valve with a value detected by the throttle sensor, the CPU adjusts the output of the engine by controlling the fuel injectors such that the motorcycle runs with a previously set negative target acceleration. Also, the CPU controls the shift actuator such that the transmission is shifted down in steps as the speed of the motorcycle decreases.

21 Claims, 8 Drawing Sheets

FOREIGN PATENT DOCUMENTS

| | | | |
|---|---|---|---|
| JP | 11-159604 | A | 6/1999 |
| JP | 2001-191819 | A | 7/2001 |
| JP | 2003-065140 | A | 3/2003 |
| JP | 2005-140084 | A | 6/2005 |
| JP | 2006-336640 | A | 12/2006 |
| JP | 3918841 | B2 | 5/2007 |
| JP | 2010058560 | A * | 3/2010 |

OTHER PUBLICATIONS

LQG/LTR Controller Design for a Gas Engine; Hofbauer, W.; Dolovai, P.; Joergl, H.P.; Hirzinger, J.; Industrial Electronics, 2006 IEEE International Symposium on; vol. 3; Digital Object Identifier: 10.1109/ISIE.2006.295990; Publication Year: 2006 , pp. 1631-1636.*

Energy compensation method for soft-landing control in camless engine with electromagnetic valve actuator; Jieng-Jang Liu; Pai-Hsiu Lu; Yee-Pien Yang; Da-Hau Ye; Yi-Ruei Cheng; Electrical Machines and Systems (ICEMS), 2011 International Conference on Digital Object Identifier: 10.1109/ICEMS.2011.6073424; Publication Year: 2011 , pp. 1-6.*

Controlled input-output-shaft synchronisation by a linear drive actuated hydraulic clutch-brake-combination; Junge, C.; Ruhland, T.; Gruber, S.; Wegener, R.; Soter, S.; AFRICON, 2011; Digital Object Identifier: 10.1109/AFRCON.2011.6072185 Publication Year: 2011 , pp. 1-5.*

A virtual rider for two-wheeled vehicles; Massaro, M.; Lot, R.; Decision and Control (CDC), 2010 49th IEEE Conference on Digital Object Identifier: 10.1109/CDC.2010.5717697; Publication Year: 2010 , pp. 5586-5591.*

Suppression of burst oscillations in racing motorcycles; Evangelou, S.A.; Limebeer, D.J.N.; Tomas-Rodriguez, M.; Decision and Control (CDC), 2010 49th IEEE Conference on; Digital Object Identifier: 10.1109/CDC.2010.5717690; Publication Year: 2010 , pp. 5578-5585.*

The dynamics of the accelerating bicycle; Limebeer, D.J.N.; Sharma, A.; Communications, Control and Signal Processing, 2008. ISCCSP 2008. 3rd International Symposium on; Digital Object Identifier: 10.1109/ISCCSP.2008.4537226; Publication Year: 2008 , pp. 237-242.*

Arai; "Control System and Vehicle"; U.S. Appl. No. 12/550,430, filed Aug. 31, 2009.

Official Communication issued in corresponding European Patent Application No. 09011090.9, mailed on Dec. 3, 2009.

* cited by examiner ns have been developed. In such an electronically-controlled throttle system, a sensor detects the amount of accelerator operation by the driver, and an ECU (Electronic Control Unit) adjusts the opening of the throttle valve according to the detected amount of accelerator operation.
CONTROL SYSTEM FOR A MOTORCYCLE

BACKGROUND OF THE INVENTION

1. Field of the Invention

The present invention relates to a control system for adjusting the output of an engine and to a vehicle having the same.

2. Description of the Related Art

Conventionally, in order to enable high-level engine control, vehicles equipped with electronically-controlled throttle systems have been developed. In such an electronically-controlled throttle system, a sensor detects the amount of accelerator operation by the driver, and an ECU (Electronic Control Unit) adjusts the opening of the throttle valve according to the detected amount of accelerator operation.

For a vehicle equipped with such an electronically-controlled throttle device, it is desired that the vehicle be designed by considering that the throttle valve might become unable to be properly controlled. Specifically, it is preferable to construct a control system that can smoothly decelerate the vehicle in the event of a control failure of the throttle valve. In this case, it is possible to prevent the reduction of operability of the vehicle even when a control failure of the throttle valve occurs. For this purpose, in the engine control device described in JP 2006-336640 A, the rotation speed of the engine is decreased according to a target rotation speed when a failure of the throttle valve control system occurs. The output of the engine is thus reduced.

SUMMARY OF THE INVENTION

The inventors of the present invention have made considerations described below. Even at the same rotation speed of the engine, the speed of the vehicle differs when the gear position of the transmission differs. Therefore, the deceleration of the vehicle differs depending on the gear position of the transmission even when the rotation speed of the engine is decreased at the same rate.

When the rotation speed of the engine is decreased according to a target rotation speed as in the method of JP 2006-336640 A, the deceleration of the vehicle differs depending on the gear position of the transmission. In this case, the driver may feel uncomfortable due to the different deceleration, which could cause the driving feeling to be degraded.

In order to overcome the problems described above, preferred embodiments of the present invention provide a control system that enables smooth deceleration of a vehicle and a vehicle having the same.

According to a preferred embodiment of the present invention, a control system for a vehicle having an engine, an electronically-controlled throttle valve, and a transmission includes a first detector arranged to detect a control failure of the electronically-controlled throttle valve, a combustion condition adjuster arranged to adjust a combustion condition of a mixture in the engine, a shift mechanism arranged to shift a gear position of the transmission, and a controller, wherein, when a control failure of the throttle valve is detected by the first detector, the controller controls the combustion condition adjuster to adjust the combustion condition of the mixture and also controls the shift mechanism to perform a shift change of the transmission such that the vehicle runs with a previously set negative target acceleration.

In the control system, when a control failure occurs in the electrically-controlled throttle valve of the vehicle, the control failure is detected by the first detector. Then, when the first detector detected the control failure, the controller controls the combustion condition adjuster and the shift mechanism such that the vehicle runs with the previously set negative target acceleration.

In this way, in this control system, when a control failure of the electronically-controlled throttle valve occurs, it is possible to set the transmission in a proper gear position while adjusting the condition of combustion of the mixture such that the vehicle runs with the negative target acceleration. This prevents discontinuous variation of the speed during the deceleration of the vehicle. As a result, the vehicle can be smoothly decelerated when a control failure of the electronically-controlled throttle valve occurs.

The controller may control the shift mechanism such that the transmission is shifted down in steps according to a reduction of the speed of the vehicle. In this case, the vehicle can be decelerated more smoothly.

The controller may control the combustion condition adjuster such that the acceleration of the vehicle continuously varies from the acceleration of the vehicle at the time of detection of the control failure to the target acceleration.

In this case, the deceleration of the vehicle can be gradually increased, so that the deceleration of the vehicle can be smoothly started without causing a shock even when a control failure occurs during acceleration of the vehicle.

The controller may control the combustion condition adjuster such that the acceleration of the vehicle decreases to the target acceleration in a first time period, and the first time period may be determined on the basis of the acceleration of the vehicle at the time of detection of the control failure. In this case, the deceleration of the vehicle can be smoothly started irrespective of the value of the acceleration of the vehicle at the time of occurrence of the control failure.

The controller may control the combustion condition adjuster such that the acceleration of the vehicle continuously varies from the target acceleration to zero when the speed of the vehicle has decreased to a previously set first reference speed.

In this case, the acceleration of the vehicle is maintained at the target acceleration until the speed of the vehicle achieves the first reference speed, so that the vehicle can be decelerated more smoothly. Also, the deceleration of the vehicle can be gradually decreased after the speed of the vehicle has decreased to the first reference speed. Thus, the driver will not feel a shock or discomfort when the deceleration of the vehicle becomes zero. As a result, the driving feeling of the vehicle is improved.

The controller may control the combustion condition adjuster such that the acceleration of the vehicle becomes zero and the speed of the vehicle becomes a previously set second reference speed in a previously set second time period.

In this case, by previously setting a suitable second time period, the deceleration of the vehicle can be smoothly and gradually decreased when the speed of the vehicle decreased to the first reference speed. This sufficiently improves the driving feeling of the vehicle.

The vehicle may further include a clutch, and the control system may further include a clutch operating mechanism arranged to disengage and engage the clutch and a second detector arranged to detect a brake operation by a driver, and the controller may control the clutch operating mechanism such that the clutch is disengaged when a brake operation by the driver is detected by the second detector after the speed of the vehicle has decreased to a previously set threshold.

In this case, the clutch is disengaged on the basis of the brake operation by the driver, so that the vehicle can be stopped on the basis of the driver's intent and desire. Also, the vehicle can be smoothly stopped because the clutch is disengaged with the speed of the vehicle being decreased lower than the previously set threshold.

The controller may control the clutch operating mechanism such that the clutch is disengaged when a condition in which the speed of the vehicle is at or below the threshold continued for a previously set third time period.

In this case, the vehicle can be properly stopped by previously setting a suitable third time period. Also, the vehicle can be smoothly stopped because the clutch is disengaged with the speed of the vehicle being lower than the previously set threshold.

The combustion condition adjuster may include a fuel injection device that supplies fuel to the engine. In this case, the output of the engine can be easily adjusted by controlling the fuel injection device.

The combustion condition adjuster may include an ignition device that ignites the mixture. In this case, the output of the engine can be easily adjusted by controlling the ignition device.

The first detector may detect the control failure by detecting an opening of the electronically-controlled throttle valve.

According to a preferred embodiment of the present invention, a vehicle includes a drive wheel, an engine, an electronically-controlled throttle valve arranged to adjust the amount of air supplied to the engine, a transmission arranged to transmit torque generated by the engine to the drive wheel, and a control system, wherein the control system includes a first detector arranged to detect a control failure of the electronically-controlled throttle valve, a combustion condition adjuster arranged to adjust a combustion condition of a mixture in the engine, a shift mechanism arranged to shift a gear position of the transmission, and a controller, wherein, when a control failure of the throttle valve is detected by the first detector, the controller controls the combustion condition adjuster to adjust the combustion condition of the mixture and also controls the shift mechanism to perform a shift change of the transmission such that the vehicle runs with a previously set negative target acceleration.

In the vehicle, the torque generated by the engine is transmitted to the drive wheel through the transmission. The torque generated by the engine can be adjusted by adjusting the opening of the electronically-controlled throttle valve.

Also, the vehicle is provided with the control system of the preferred embodiment of the present invention. Accordingly, when a control failure of the electronically-controlled throttle valve occurs, it is possible to set the transmission in proper gear positions while adjusting the condition of combustion of the mixture such that the vehicle runs with the negative target acceleration. This prevents discontinuous variation of the speed during the deceleration of the vehicle. As a result, the vehicle can be smoothly decelerated when a control failure of the electronically-controlled throttle valve occurs.

Other features, elements, characteristics, and advantages of the present invention will become more apparent from the following description of preferred embodiments of the present invention with reference to the attached drawings.

DETAILED DESCRIPTION OF THE PREFERRED EMBODIMENTS

Figure 1:
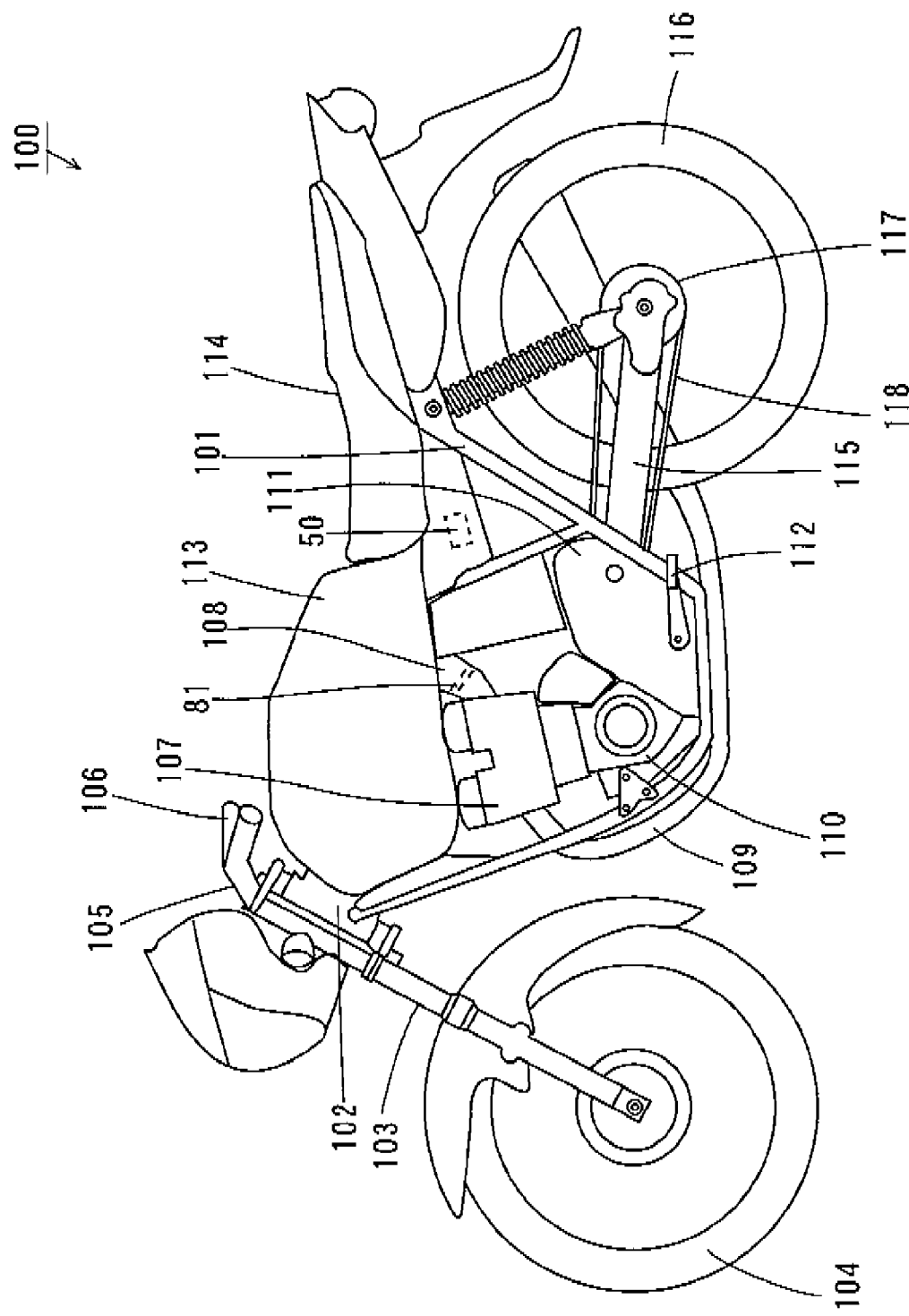
FIG. 1 is a schematic side view illustrating a motorcycle.

Now, a vehicle equipped with a control system according to preferred embodiments of the present invention will be described referring to the drawings. The description below describes a motorcycle as an example of the vehicle. Also, as an example of the control system, the description below describes a semi-automatic speed change control system that automatically performs the gear change of the transmission on the basis of a shifting operation by the driver.

(1) Outline of Structure of Motorcycle

FIG. 1 is a schematic side view illustrating a motorcycle according to this preferred embodiment.

In the motorcycle 100 of FIG. 1, a head pipe 102 is provided at the front end of a body frame 101. A front fork 103 is attached to the head pipe 102 in such a way that it can turn from side to side. A front wheel 104 is rotatably supported at the lower end of the front fork 103. A handle 105 is provided at the upper end of the head pipe 102.

The handle 105 is equipped with an accelerator grip 106. A four-cylinder engine 107, for example, is provided in the center of the body frame 101. A throttle body 108 is attached to the intake port of the engine 107, and an exhaust pipe 109 is attached to the exhaust port of the engine 107. The throttle body 108 has an electronically-controlled throttle valve 81. The amount of air supplied to the four cylinders of the engine 107 is adjusted by adjusting the opening of the throttle valve 81 (hereinafter referred to as throttle opening).

A crankcase 110 is attached to the lower portion of the engine 107. A crank 2 (see FIG. 2) of the engine 107 is accommodated in the crankcase 110.

A transmission case 111 is disposed in the lower portion of the body frame 101. The transmission case 111 contains a transmission 5 (see FIG. 2) and a shift mechanism 6 (see FIG. 2) that will be described later. A shift pedal 112 is provided on the transmission case 111.

In this preferred embodiment, changing the gear position of the transmission 5 does not require an operation to disengage the clutch 3 (see FIG. 2) by the driver. That is to say, the motorcycle 100 of this preferred embodiment is preferably equipped with a semi-automatic speed change control system that automatically changes the gear positions of the transmission 5 on the basis of a shifting operation by the driver. The speed change control system will be fully described later.

A fuel tank 113 is provided over the engine 107, and a seat 114 is disposed in the rear of the fuel tank 113. An ECU 50 (Electronic Control Unit) is disposed under the seat 114. A rear arm 115 is connected to the body frame 101 and extends in the rear of the engine 107. The rear arm 115 rotatably holds a rear wheel 116 and a rear wheel driven sprocket 117. A chain 118 is attached to the rear wheel driven sprocket 117.

(2) Structures of Transmission and Shift Mechanism

Next, the transmission and the shift mechanism provided in the transmission case 111 of FIG. 1 will be described.

Figure 2:
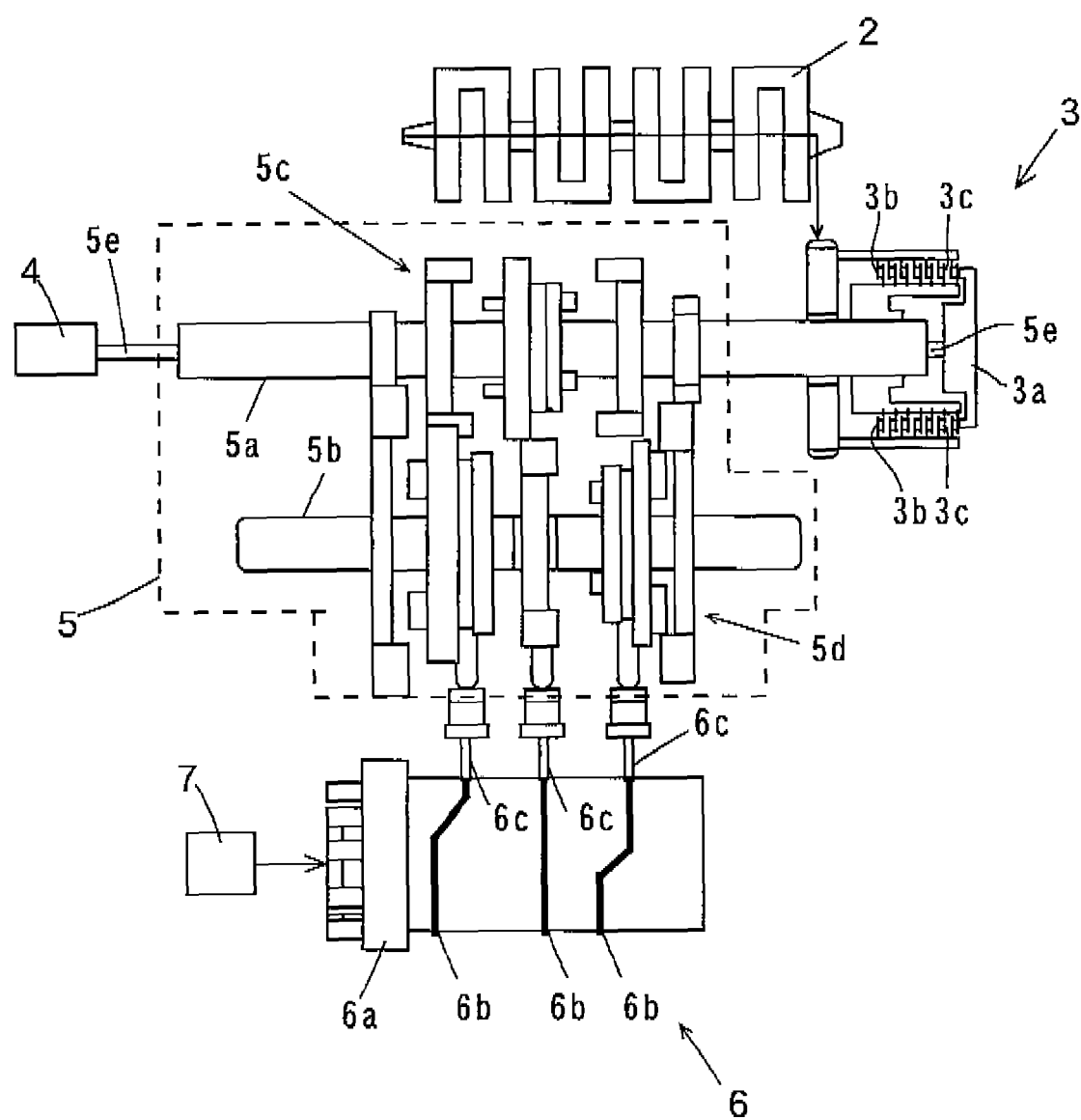
FIG. 2 is a diagram illustrating the structures of a transmission and a shift mechanism.

FIG. 2 is a diagram illustrating the structures of the transmission and the shift mechanism.

As shown in FIG. 2, the transmission 5 has a main shaft 5a and a drive shaft 5b. Multi-stage (e.g., five-stage) transmission gears 5c are mounted on the main shaft 5a, and multi-stage transmission gears 5d are mounted on the drive shaft 5b.

The main shaft 5a is coupled to the crank 2 of the engine 107 (FIG. 1) through a clutch 3. The clutch 3 has a pressure plate 3a, a plurality of clutch disks 3b, and a plurality of friction disks 3c. The clutch disks 3b rotate with the torque transmitted from the crank 2. The friction disks 3c are coupled to the main shaft 5a and rotate around the main shaft 5a as the axis of rotation.

The friction disks 3c are energized by the pressure plate 3a in a direction such that they are in close contact with the clutch disks 3b. Hereinafter, a state in which a plurality of clutch disks 3b and a plurality of friction disks 3c are in close contact with each other is referred to as a state in which the clutch 3 is engaged, and a state in which a plurality of clutch disks 3b and a plurality of friction disks 3c are separated from each other is referred to as a state in which the clutch 3 is disengaged. When the clutch 3 is engaged, the torque of the crank 2 is transmitted to the main shaft 5a through the clutch disks 3b and friction disks 3c, but the torque of the crank 2 is not transmitted to the main shaft 5a when the clutch 3 is disengaged.

A push rod 5e is inserted in the main shaft 5a. One end of the push rod 5e is coupled to the pressure plate 3a, and its other end is coupled to an electric or hydraulic clutch actuator 4.

In this preferred embodiment, the push rod 5e is pushed out toward the clutch 3 when the clutch actuator 4 is driven by control by the ECU 50. Then, the pressure plate 3a is pressed and the clutch disks 3b and friction disks 3c separate from each other. The clutch 3 is disengaged as a result.

When the clutch 3 is being engaged, the torque transmitted from the crank 2 to the main shaft 5a is transmitted to the drive shaft 5b through the transmission gears 5c and 5d. The chain 118 shown in FIG. 1 is attached to the drive shaft 5b. The torque of the drive shaft 5b is transmitted to the rear wheel 116 (FIG. 1) through the chain 118 and the rear wheel driven sprocket 117 (FIG. 1). The motorcycle 100 thus runs.

The reduction ratio between the main shaft 5a and the drive shaft 5b is determined by the combination of transmission gears 5c and 5d. Also, the reduction ratio between the main shaft 5a and the drive shaft 5b is changed by shifting some of the plurality of transmission gears 5c and 5d. The transmission gears 5c and 5d are moved by the shift mechanism 6.

The shift mechanism 6 has a shift cam 6a. The shift cam 6a has a plurality of cam grooves 6b (for example, three in FIG. 2). Shift forks 6c are attached respectively to the cam grooves 6b. The shift cam 6a is connected to an electric or hydraulic shift actuator 7 through a link mechanism not shown.

In this preferred embodiment, the shift cam 6a is rotated when the shift actuator 7 is driven by control by the ECU 50. This causes the shift forks 6c to move along the respective cam grooves 6b. As a result, some transmission gears 5c and 5d are moved and the gear positions of the transmission 5 are changed.

(3) Speed Change Control System

Next, the speed change control system of the motorcycle 100 will be described.

Figure 3:
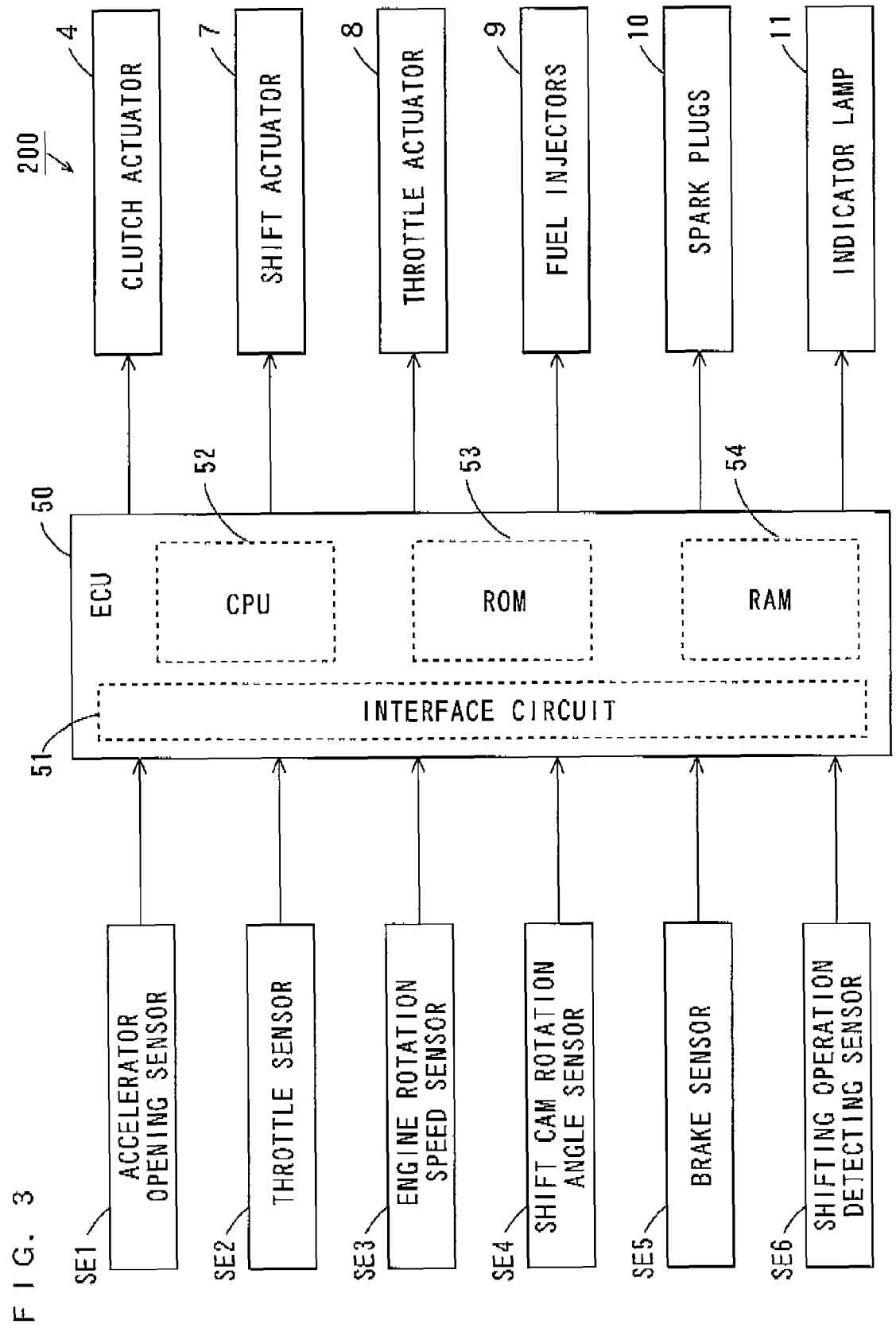
FIG. 3 is a block diagram illustrating the structure of a speed change control system.

FIG. 3 is a block diagram illustrating the structure of the speed change control system of this preferred embodiment.

As shown in FIG. 3, the speed change control system 200 of this preferred embodiment includes an accelerator opening sensor SE1, a throttle sensor SE2, an engine rotation speed sensor SE3, a shift cam rotation angle sensor SE4, a brake sensor SE5, a shifting operation detecting sensor SE6, the ECU 50, a clutch actuator 4, a shift actuator 7, a throttle actuator 8, a plurality of fuel injectors 9, a plurality of spark plugs 10, and an indicator lamp 11.

The accelerator opening sensor SE1 detects the amount of operation of the accelerator grip 106 (FIG. 1) by the driver (hereinafter referred to as accelerator opening) and provides the detected accelerator opening to the ECU 50. The throttle sensor SE2 detects the throttle opening and provides the detected throttle opening to the ECU 50. The engine rotation speed sensor SE3 detects the rotation speed of the engine 107 (FIG. 1) and provides the detected rotation speed to the ECU 50. In this preferred embodiment, the engine rotation speed sensor SE3 detects the rotation speed of the engine 107 preferably by detecting the angular speed of the crank 2 (FIG. 2), for example.

The shift cam rotation angle sensor SE4 detects the rotation angle of the shift cam 6a (FIG. 2) and provides the detected rotation angle to the ECU 50. The brake sensor SE5 detects the amount of operation of a brake lever (not shown) and/or brake pedal (not shown) by the driver, and provides the detected amount of operation to the ECU 50.

The shifting operation detecting sensor SE6 detects the direction of operation of the shift pedal 112 (FIG. 1) by the driver, and provides a signal indicating the detected operation direction to the ECU 50 (a signal indicating up-shifting or a signal indicating down-shifting). The shifting operation detecting sensor SE6 preferably includes a potentiometer, load sensor or magnetostrictive sensor, for example. Also, for example, the shifting operation detecting sensor SE6 outputs a positive-value signal when detecting the up-shifting operation, and outputs a negative-value signal when detecting the down-shifting operation.

The ECU 50 preferably includes an interface circuit 51, a CPU (Central Processing Unit) 52, a ROM (Read Only Memory) 53, and a RAM (Random Access Memory) 54, for example.

The output signals from the above-described sensors SE1 to SE6 are provided to the CPU 52 through the interface circuit 51. As will be described later, the CPU 52 adjusts the output of the engine 107 on the basis of the results detected by the sensors SE1 to SE6. The ROM 53 stores a control program for the CPU 52, and so on. The RAM 54 functions as a work area for the CPU 52 while storing various data.

The shift actuator 7 is electric or hydraulic, for example, and rotates the shift cam 6a (FIG. 2) under control of the CPU 52. The throttle actuator 8 includes an electric motor, for example, and adjusts the opening of the throttle valve 81 under control of the CPU 52.

The fuel injectors 9 are provided in correspondence with the cylinders of the engine 107. Accordingly, in this preferred embodiment, the engine 107 preferably has four fuel injectors 9, for example. Also, the spark plugs 10 are provided respectively for the cylinders of the engine 107. Accordingly, in this preferred embodiment, the engine 107 preferably has four spark plugs 10, for example.

The indicator lamp 11 is provided on the handle 105 (FIG. 1), for example, and is lit by the CPU 52 when a control failure of the throttle valve 81 occurs.

(4) Control Operations by CPU

Now, the control operations of the CPU 52 will be described for the normal run of the motorcycle 100, for the shift change of the transmission 5, and for the occurrence of a control failure of the throttle valve 81.

(a) Operation During Normal Run

When the motorcycle 100 is normally running, the CPU 52 controls the throttle actuator 8 on the basis of the accelerator opening detected by the accelerator opening sensor SE1. The throttle opening is then adjusted and the output of the engine 107 is adjusted. The relationship between the accelerator opening and throttle opening is previously stored in the ROM 53 (or the RAM 54) of the ECU 50.

Also, the CPU 52 applies feedback control to the throttle actuator 8 on the basis of the throttle opening detected by the throttle sensor SE2. This enables the throttle opening to be more properly adjusted.

(b) Output Control for Shift Change

Next, the adjustment of the output of the engine 107 that is performed by the CPU 52 when the driver has operated the shift pedal 112 for shift change will be described.

Figure 4:
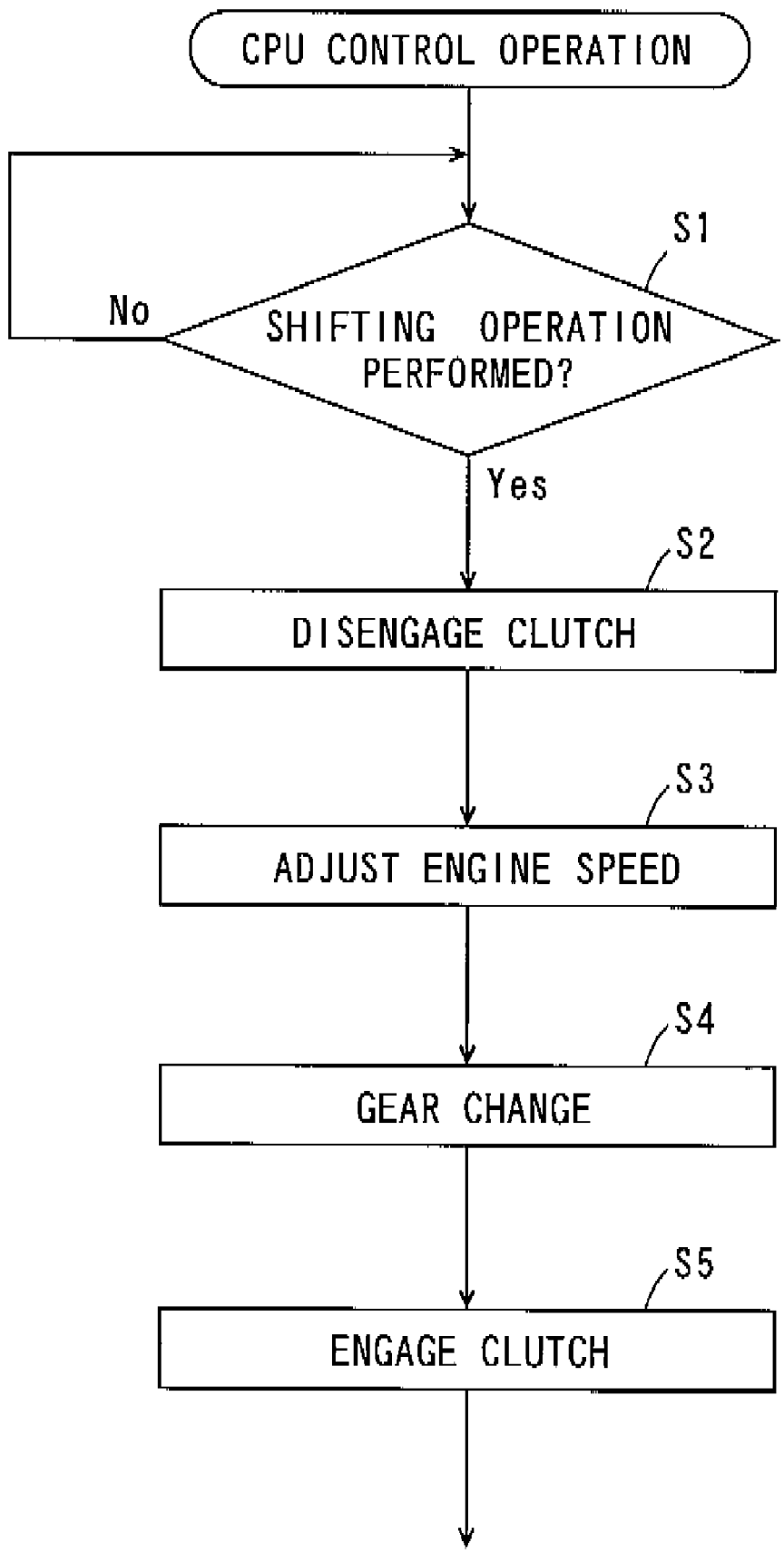
FIG. 4 is a flowchart illustrating an example of control operation by a CPU for shift change.

FIG. 4 is a flowchart showing an example of the control operation by the CPU 52 for the shift change.

As shown in FIG. 4, the CPU 52 first determines whether the driver has performed a shifting operation, on the basis of the output signal of the shifting operation detecting sensor SE6 (FIG. 3 (Step S1)). When shifting operation is not performed by the driver, the CPU 52 waits until the shifting operation is performed.

When the driver performed the shifting operation, the CPU 52 disengages the clutch 3 (FIG. 2) by controlling the clutch actuator 4 (FIG. 2 (Step S2)).

Next, the CPU 52 adjusts the throttle opening by controlling the throttle actuator 8 (FIG. 3) so as to increase or decrease the rotation speed of the engine 107 (Step S3). Specifically, when the driver performs a down-shifting operation while the motorcycle 100 is decelerating, the CPU 52 makes the throttle opening larger than the value determined on the basis of the accelerator opening. This raises the rotation speed of the engine 107. Also, for example, when an up-shifting operation is performed by the driver while the motorcycle 100 is accelerating, the CPU 52 makes the throttle opening smaller than the value determined on the basis of the accelerator opening. This lowers the rotation speed of the engine 107.

The processing in Step S3 prevents any significant difference between the rotation speed of the main shaft 5a (the friction disks 3c (FIG. 2)) and the rotation speed of the clutch disks 3b (FIG. 2) that would occur when the clutch 3 is engaged in Step S5 described later. This prevents the generation of a shift shock of the motorcycle 100.

Next, the CPU 52 controls the shift actuator 7 (FIG. 3) to rotate the shift cam 6a (FIG. 2 (Step S4)). This moves the shift forks 6c (FIG. 2) to move the transmission gears 5c (FIG. 2) or 5d (FIG. 2). As a result, the gear position of the transmission 5 is changed.

After that, the CPU 52 controls the clutch actuator 4 to engage the clutch 3 (Step S5). The shift change of the transmission 5 is thus completed.

(c) Operation in the Event of Control Failure of Throttle Valve

In this preferred embodiment, the CPU 52 smoothly decelerates and stops the motorcycle 100 in the event of the occurrence of a control failure of the throttle valve 81.

In more detail, for example, the CPU 52 determines that a control failure of the throttle valve 81 has occurred when a difference between a target value of the throttle opening determined on the basis of the accelerator opening and the throttle opening detected by the throttle sensor SE2 is equal to or greater than a previously set value. In this case, the CPU 52 determines that a malfunction is occurring in the throttle actuator 8, and reduces the output of the engine 107 without adjusting the throttle opening with the actuator 8, so as to stop the motorcycle 100.

The method for detecting a control failure of the throttle valve 81 is not limited to the above-described example, but a control failure of the throttle valve 81 may be detected on the basis of conditions of other components related to the operation of the throttle valve 81. For example, when two throttle sensors SE2 are provided to detect the throttle opening, the throttle valve 81 maybe judged to be suffering a control failure when the difference between the throttle openings detected by the two throttle sensors SE2 is equal to or larger than a previously set value. In this case, the CPU 52 determines that a detection failure is occurring in one of the two throttle sensors SE2, and decreases the output of the engine 107 without adjusting the throttle opening with the actuator 8, so as to stop the motorcycle 100.

When a control failure of the throttle valve 81 is occurring, the CPU 52 decreases the output of the engine 107 by controlling the plurality of fuel injectors 9.

(c-1) Outline of Control Operation by CPU in the Event of Control Failure

In this preferred embodiment, when a control failure of the throttle valve 81 occurs, the CPU 52 adjusts the output of the engine 107 and performs a gearshift of the transmission 5 such that the motorcycle 100 runs with a previously set negative target acceleration. Also, when the driver performs a brake operation after the occurrence of the control failure of the throttle valve 81, the CPU 52 corrects the target acceleration on the basis of the amount of brake operation, and adjusts the output of the engine 107 and performs the gearshift of the transmission 5 such that the motorcycle 100 runs with the corrected target acceleration. Now, referring to the drawings, the speed and acceleration of the motorcycle 100 at the time of an occurrence of a control failure will be described. The initial value of the target acceleration is previously stored in the RAM 54.

Figure 5:
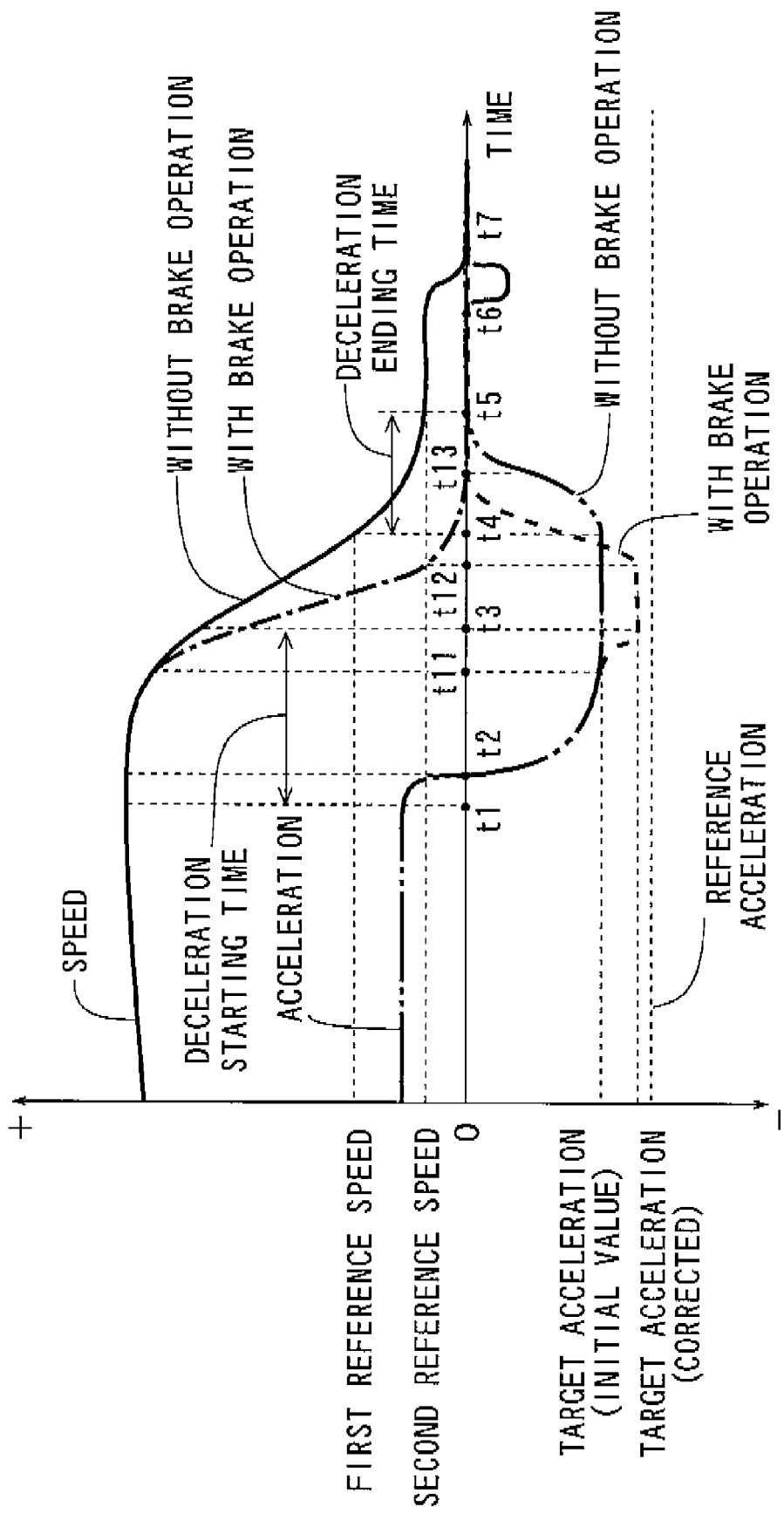
FIG. 5 is a diagram illustrating a relationship between speed and acceleration of a motorcycle in the event of the occurrence of a control failure of the throttle valve.

FIG. 5 is a diagram illustrating a relationship between the speed and acceleration of the motorcycle 100 at the time of an occurrence of a control failure of the throttle valve 81. In FIG. 5, solid line and one-dot chain line indicate variations with time of the speed of the motorcycle 100, and two-dot chain line and broken line indicate variations with time of the acceleration. The solid line and two-dot chain line indicate variations with time of the speed and acceleration in the absence of a brake operation, and the one-dot chain line and broken line indicate variations with time of the speed and acceleration in the presence of a brake operation.

FIG. 5 shows examples in which a control failure of the throttle valve 81 occurs during acceleration of the motorcycle 100. Also, in FIG. 5, the control failure of the throttle valve 81 is detected by the CPU 52 at time t1.

First, an example will be described in which the driver does not perform a brake operation after the occurrence of the control failure of the throttle valve 81.

When the driver does not perform a brake operation, the CPU 52 detects the control failure of the throttle valve 81 at time t1, and then lowers the output of the engine 107 in such a way that the acceleration of the motorcycle 100 continuously decreases to a previously set target acceleration.

In this preferred embodiment, as stated before, a negative value is set as the target acceleration. Accordingly, the motorcycle 100 decelerates when the acceleration of the motorcycle 100 is at the target acceleration. In the example of FIG. 5, the acceleration of the motorcycle 100 varies from a positive value to a negative value at time t2, and the motorcycle 100 starts decelerating.

After the acceleration of the motorcycle 100 has decreased to the target acceleration at time t3, the CPU 52 adjusts the output of the engine 107 such that the acceleration of the motorcycle 100 is maintained at the target acceleration. This decelerates the motorcycle 100 at a certain deceleration. At this time, the CPU 52 also controls the shift actuator 7 so as to shift down the transmission 5 in steps as the speed of the motorcycle 100 decreases. This prevents discontinuous variations of the speed of the motorcycle 100. The motorcycle 100 is smoothly decelerated as a result.

The reference acceleration shown in FIG. 5 is an acceleration of the motorcycle 100 that is exhibited when the transmission 5 is set in the middle gear position and the maximum engine brake in that gear position is occurring in the motorcycle 100. For example, when the transmission 5 has neutral and first to fifth gear positions, the reference acceleration is the acceleration of the motorcycle 100 that is achieved when the maximum engine brake is occurring in the motorcycle 100 in the third gear position.

In this preferred embodiment, for example, the absolute value of the initial value of the target acceleration is set to be smaller than the absolute value of the reference acceleration. In this case, the motorcycle 100 is decelerated with proper deceleration, which improves the driving feeling of the motorcycle 100 during the deceleration.

Next, when the speed of the motorcycle 100 has decreased to a previously set first reference speed at time t4, the CPU 52 raises the acceleration of the motorcycle 100. Specifically, the CPU 52 continuously raises the acceleration of the motorcycle 100 to zero such that the speed of the motorcycle 100 achieves a previously set second reference speed at time t5. It is preferred that the first reference speed be not less than about 20 km/h nor more than about 30 km/h, and that the second reference speed be not less than about 5 km/h nor more than about 10 km/h, for example.

After that, at time t6 at which a given time (e.g., approximately five seconds) has passed after the speed of the motorcycle 100 decreased to the second reference speed, the CPU 52 disengages the clutch 3. This lowers the speed and the motorcycle 100 stops at time t7.

In this way, in this preferred embodiment, when a control failure of the throttle valve 81 occurs, the acceleration of the motorcycle 100 is lowered by control of the CPU 52 to continuously vary to the target acceleration. In this case, the deceleration of the motorcycle 100 can be increased gradually so that the deceleration of the motorcycle 100 can be smoothly started without causing a shock.

Also, in this preferred embodiment, the acceleration of the motorcycle 100 is preferably maintained at the target acceleration until the speed achieves the previously set first reference speed. This enables smooth deceleration of the motorcycle 100.

Also, in this preferred embodiment, after the speed decreased to the first reference speed, the acceleration of the motorcycle 100 continuously varies to rise to zero. In this case, the deceleration of the motorcycle 100 is gradually decreased, so that the driver will not experience an acceleration feeling when the acceleration of the motorcycle 100 becomes zero. This improves the driving feeling of the motorcycle 100.

The time from the time t4 at which the acceleration of the motorcycle 100 starts rising to the time t5 at which the acceleration becomes zero (hereinafter referred to as a deceleration ending time) is previously set in the ROM 53 (or the RAM 54). The deceleration ending time is preferably set to be not less than about 2 seconds nor more than about 6 seconds, for example. In this case, the deceleration of the motorcycle 100 can be softly decreased to improve the driving feeling of the motorcycle 100.

After that, the motorcycle 100 runs at the second reference speed for a given time and then stops. Thus, the motorcycle 100 can stop smoothly.

In this preferred embodiment, the time from the time t1 at which a control failure is detected to the time t3 at which the acceleration of the motorcycle 100 is lowered to the target acceleration (hereinafter referred to as a deceleration starting time) is determined on the basis of the acceleration of the motorcycle 100 at the time t1 at which the control failure is detected. Specifically, for example, a map indicating the relationship between the acceleration and the deceleration starting time is previously stored in the ROM 53 (or the RAM 54). When detecting a control failure of the throttle valve 81, the CPU 52 calculates the deceleration starting time from that map on the basis of the acceleration at that time. Then, the CPU 52 adjusts the output of the engine 107 such that the acceleration decreases to the target acceleration in that deceleration starting time.

The deceleration starting time is preferably set longer as the acceleration at time t1 is larger. Setting the deceleration starting time in this way enables the deceleration of the motorcycle 100 to be smoothly started irrespective of the value of the acceleration at the time of occurrence of the control failure.

The speed and acceleration of the motorcycle 100 are calculated by the CPU 52 on the basis of the value detected by the engine rotation speed sensor SE3 and the value detected by the shift cam rotation angle sensor SE4. Specifically, the CPU 52 calculates the speed and acceleration of the motorcycle 100 on the basis of the angular speed of the crank 2, the reduction ratio of the transmission 5, the primary reduction ratio between the engine 107 and the transmission 5, and so on.

Next, an operation will be described which is performed when the driver performs a brake operation during the deceleration control of the motorcycle 100 by the CPU 52.

For example, when the driver performs a brake operation at time t11 in the deceleration starting time, the CPU 52 corrects the target acceleration such that its absolute value becomes larger. Then, the CPU 52 lowers the output of the engine 107 such that the motorcycle 100 runs with the corrected target acceleration, and also shifts down the transmission 5 in steps as the speed of the motorcycle 100 decreases.

This suppresses the reduction of the engine brake power during the deceleration control of the motorcycle 100. As a result, when the driver performs a brake operation, the driver will not feel unnaturalness due to the reduction of the engine brake power.

After that, the CPU 52 starts the operation of disengaging the clutch 3 at time t12 at which the speed of the motorcycle 100 decreases to the second reference speed. This reduces the deceleration of the motorcycle 100, and the driver can smoothly stop the motorcycle 100 by adjusting the amount of brake operation.

As described above, in this preferred embodiment, when the driver performs a brake operation during the deceleration control of the motorcycle 100 by the CPU 52, the target acceleration is corrected so that the absolute value becomes larger. Then, the output of the engine 107 is lowered and the transmission 5 is shifted down such that the motorcycle 100 runs with the corrected target acceleration. This prevents the reduction of the engine brake power even when the driver performs a brake operation during the deceleration control of the motorcycle 100. As a result, the driving feeling of the motorcycle 100 is improved.

The amount of correction of the target acceleration is adjusted on the basis of the amount of brake operation detected by the brake sensor SE5 (FIG. 3). Accordingly, even when the amount of brake operation by the driver is large, the target acceleration is corrected according to the amount of operation, which prevents significant reduction of the engine brake power of the motorcycle 100.

Also, in this preferred embodiment, when the amount of brake operation detected by the brake sensor SE5 is sufficiently large, for example, the CPU 52 corrects the target acceleration such that the deceleration of the motorcycle 100 is the maximum deceleration that is determined for each gear position of the transmission 5. The maximum deceleration is the deceleration of the motorcycle 100 that is achieved when the maximum engine brake is occurring at each gear position of the transmission 5.

(c-2) Control Operation by CPU in the Event of Control Failure

Next, the control operation of the CPU 52 that is performed in the event of an occurrence of a control failure of the throttle valve 81 will be described referring to the drawings.

Figure 6:
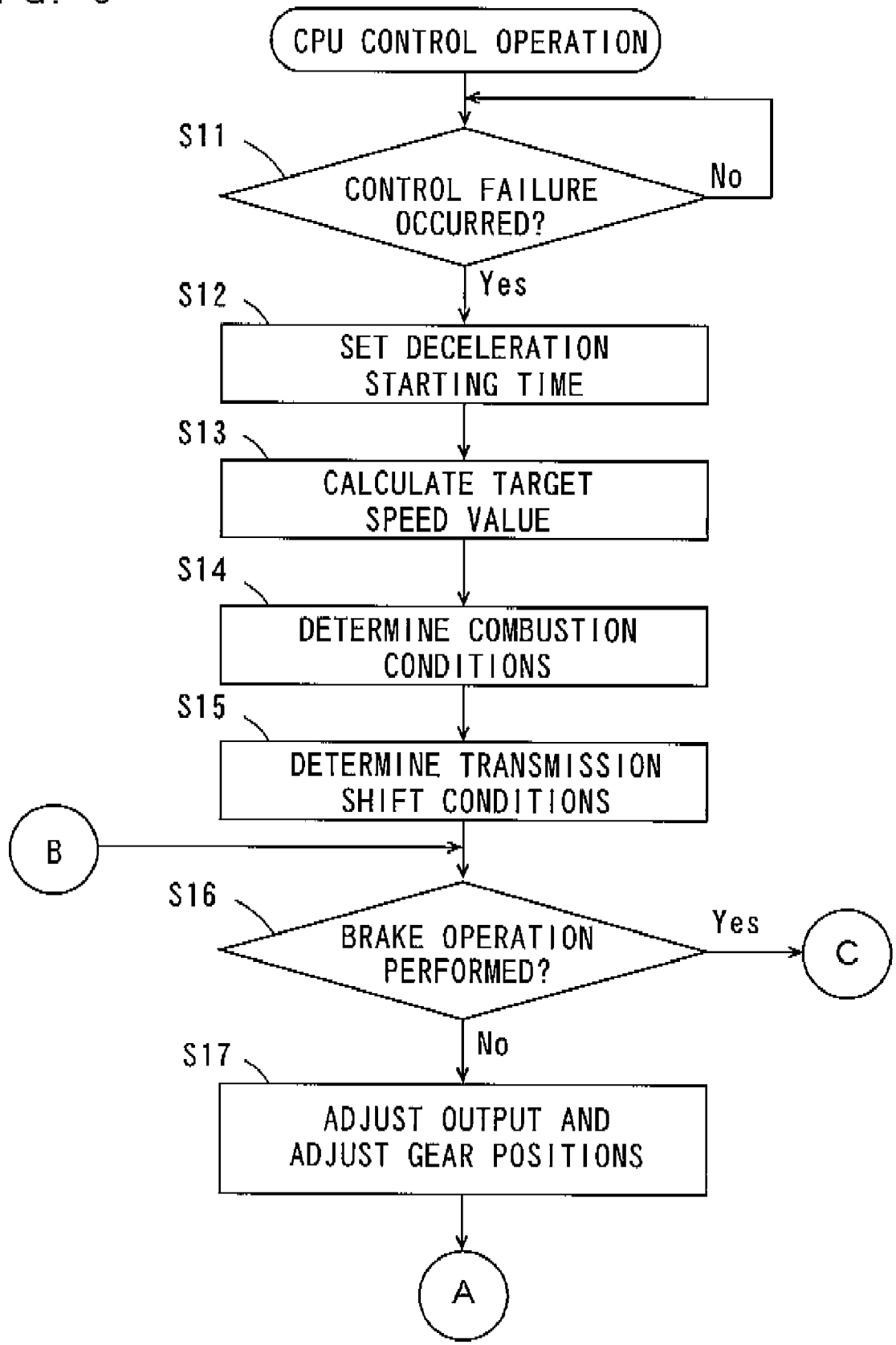
FIG. 6 is a flowchart illustrating an example of control operation by the CPU.
Figure 7:
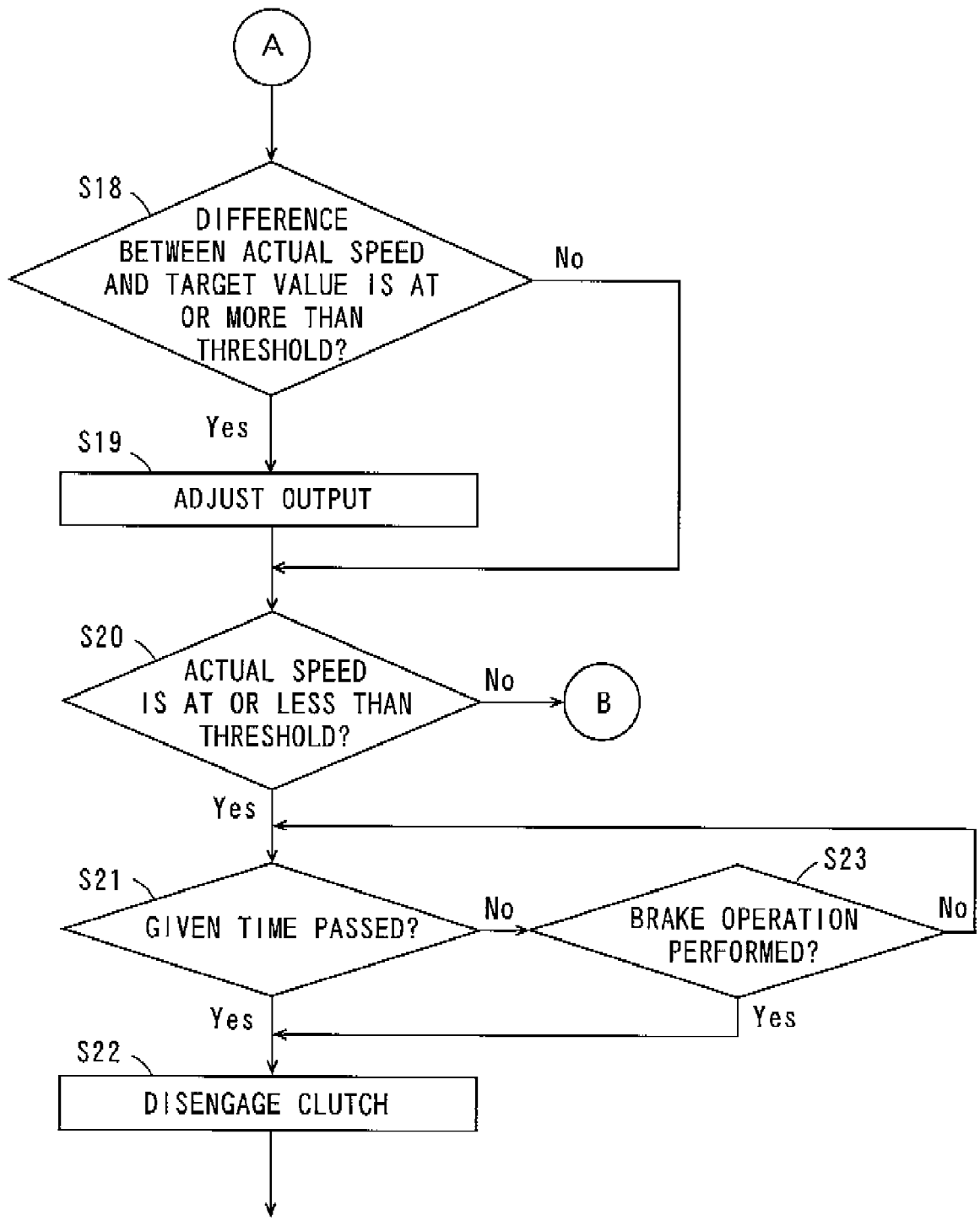
FIG. 7 is a flowchart illustrating an example of control operation by the CPU.
Figure 8:
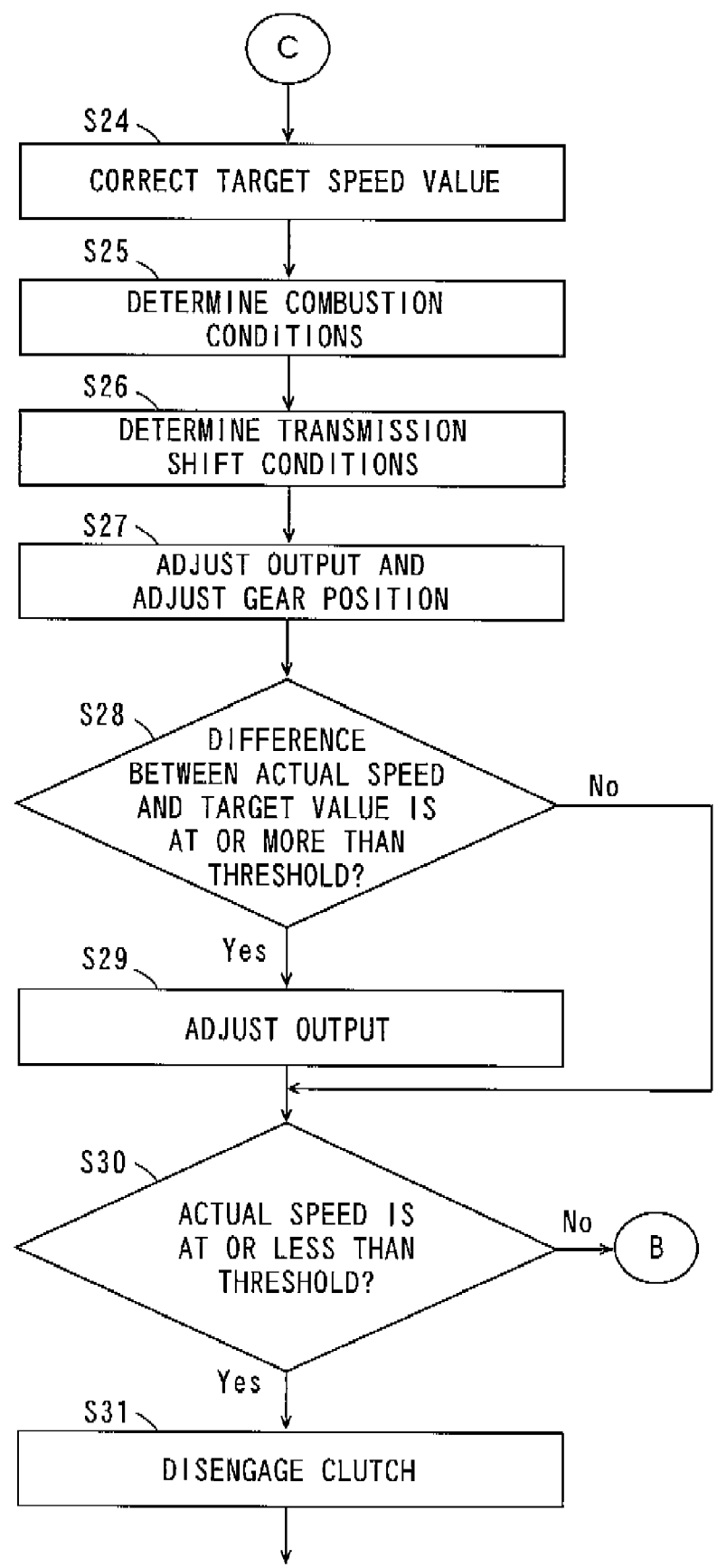
FIG. 8 is a flowchart illustrating an example of control operation by the CPU.

FIGS. 6, 7 and 8 are flowcharts illustrating an example of the control operation of the CPU 52.

As shown in FIG. 6, first, the CPU 52 determines whether a control failure of the throttle valve 81 has occurred (Step S11). When there is no control failure of the throttle valve 81, the CPU 52 controls the output for the normal running or for the shift change, as described above, until a control failure occurs.

When a control failure of the throttle valve 81 has occurred, the CPU 52 sets a deceleration starting time on the basis of the acceleration of the motorcycle 100 as described with FIG. 5 (Step S12).

Next, the CPU 52 calculates a target value of the speed of the motorcycle 100 from the time of occurrence of the control failure of the throttle valve 81 to the reduction of the speed of the motorcycle 100 to the second reference speed (FIG. 5 (Step S13)). For example, in Step S13, the CPU 52 calculates the target value of the speed on the basis of the deceleration starting time set in Step S12, the initial value of the target acceleration (FIG. 5) stored in the RAM 54, the deceleration ending time stored in the ROM 53 (or the RAM 54), and so on. The target value of speed is a value that varies with the passage of time from the time of occurrence of the control failure.

Next, the CPU 52 determines combustion conditions for each cylinder of the engine 107 such that the speed of the motorcycle 100 decreases according to the target value of speed calculated in Step S13 (Step S14). Specifically, the condition that are determined include the amount of fuel injection by the fuel injectors 9 (FIG. 3), the timing of fuel injection by the fuel injectors 9, in which cylinders the fuel injection by the fuel injectors 9 should be stopped, the ignition timing of the mixture by the spark plugs 10 (FIG. 3), in which cylinders the ignition of the mixture by the spark plugs 10 should be stopped, and so on. For example, controlling the amount of fuel injection causes an A/F (air-fuel ratio) to be controlled.

Next, the CPU 52 determines shifting conditions of the gear positions of the transmission 5 on the basis of the target value of speed calculated in Step S13 (Step S15). Specifically, the CPU 52 determines the shifting conditions such that the transmission 5 is shifted down in steps as the target value of speed decreases.

For example, the shifting conditions of the gear positions include a plurality of thresholds. Each threshold is indicated as a speed of the motorcycle 100. In this preferred embodiment, in the processing of Step S17 described later, the CPU 52 shifts down the transmission 5 by one step when the target value of speed has decreased to a threshold. Thus, the transmission 5 is shifted down in steps as the target value of speed decreases, which enables smooth deceleration of the motorcycle 100.

Next, the CPU 52 determines whether the driver performed a brake operation on the basis of the value detected by the brake sensor SE5 (FIG. 3 (Step S16)). When the driver did not perform a brake operation, the CPU 52 adjusts the output of the engine 107 and sets the transmission 5 in the proper gear positions (Step S17) by controlling the clutch actuator 4 (FIG. 3), the shift actuator 7 (FIG. 3), the fuel injectors 9 and spark plugs 10 on the basis of the combustion conditions and shifting conditions determined in Step S14 and Step S15.

Next, as shown in FIG. 7, the CPU 52 determines whether the difference between the actual speed of the motorcycle 100 calculated on the basis of the values detected by the engine rotation speed sensor SE3 and the shift cam rotation angle sensor SE4 and the target value of speed calculated in Step S13 is equal to or more than a threshold (e.g., about 2 km/h), or not (Step S18). When the difference is equal to or more than the threshold, the CPU 52 controls the spark plugs 10 to adjust the output of the engine 107 such that the actual speed of the motorcycle 100 becomes closer to the target value of speed (Step S19).

In Step S19, when the actual speed of the motorcycle 100 is faster than the target value of speed, for example, the CPU 52 retards the ignition timing of the mixture by the spark plugs 10. Also, for example, when the actual speed of the motorcycle 100 is slower than the target value of speed, it advances the ignition timing of the mixture by the spark plugs 10. In Step S19, the output of the engine 107 may be adjusted by controlling the fuel injectors 9.

Next, the CPU 52 determines whether the actual speed of the motorcycle 100 is equal to or less than a previously set threshold, or not (Step S20). The threshold in Step S20 is set at a speed that is faster by about 2 km/h than the second reference speed, for example.

When the actual speed of the motorcycle 100 is equal to or less than the threshold, the CPU 52 determines whether a previously set time (e.g., about five seconds) has passed in that condition (Step S21). When the condition in which the actual speed of the motorcycle 100 is at or below the threshold was maintained for the previously set time, the CPU 52 disengages the clutch 3 by controlling the clutch actuator 4 (Step S22). This allows the driver to smoothly stop the motorcycle 100.

When, in Step S18, the difference between the actual speed of the motorcycle 100 and the target value of speed is smaller than the threshold, the CPU 52 moves to the processing of Step S20 without adjusting the output of the engine 107.

When, in Step S20, the actual speed of the motorcycle 100 is larger than the threshold, the CPU 52 returns to Step S16 of FIG. 6.

When, in Step S21 of FIG. 7, the previously set time has not passed yet, the CPU 52 determines whether the driver performed a brake operation on the basis of the value detected by the brake sensor SE5 (Step S23). When the driver performed a brake operation, the CPU 52 determines that the driver is trying to stop the motorcycle 100, and moves to Step S22 to disengage the clutch 3. This allows the motorcycle 100 to be smoothly stopped. In the absence of a brake operation by the driver, the CPU 52 returns to Step S21.

Step S23 determines that the brake operation was performed when the brake sensor SE5 detected a brake operation after Step S20 determined that the actual speed is at or less than the threshold.

When Step S16 of FIG. 6 determined that the brake operation was performed, the CPU 52 corrects, as shown in FIG. 8, the target value of speed calculated in Step S13 (Step S24).

For example, in Step S24, the CPU 52 corrects the target value of speed such that the deceleration of the motorcycle 100 varies according to the amount of a brake operation detected by the brake sensor SE5. More specifically, as described with FIG. 5, the CPU 52 corrects the target value of speed by increasing the absolute value of the target acceleration according to the amount of the brake operation by the driver. When the CPU 52 corrects the target value of speed, it increases the absolute value of the target acceleration in such a way that the acceleration (deceleration) continuously varies.

Next, the CPU 52 determines combustion conditions for each cylinder of the engine 107 such that the speed of the motorcycle 100 decreases according to the target value of speed corrected in Step S24 (Step S25). Next, the CPU 52 determines shifting conditions of the gear positions of the transmission 5 on the basis of the target value of speed corrected in Step S24 (Step S26).

Next, the CPU 52 adjusts the output of the engine 107 and sets the transmission 5 in the proper gear positions (Step S27) by controlling the clutch actuator 4, the shift actuator 7, the fuel injectors 9 and spark plugs 10 on the basis of the combustion conditions and shifting conditions determined in Step S25 and Step S26.

Next, the CPU 52 determines whether the difference between the actual speed of the motorcycle 100 calculated on the basis of the values detected by the engine rotation speed sensor SE3 and the shift cam rotation angle sensor SE4 and the target value of speed corrected in Step S24 is equal to or more than a threshold, or not (the same value as the threshold of Step S18 of FIG. 7 (Step S28)). When the difference is equal to or more than the threshold, the CPU 52 controls the spark plugs 10 and/or fuel injectors 9 to adjust the output of the engine 107 such that the actual speed of the motorcycle 100 becomes closer to the target value of speed (Step S29).

Next, the CPU 52 determines whether the actual speed of the motorcycle 100 is equal to or less than a previously set threshold, or not (the same value as the threshold in Step S20 of FIG. 7 (Step S30)).

When the actual speed of the motorcycle 100 is equal to or less than the threshold, the CPU 52 determines that the speed of the motorcycle 100 has sufficiently decreased, and disengages the clutch 3 by controlling the clutch actuator 4 (Step S31). This allows the driver to smoothly stop the motorcycle 100.

When, in Step S28, the difference between the actual speed of the motorcycle 100 and the target value of speed is smaller than the threshold, the CPU 52 moves to the processing of Step S30 without adjusting the output of the engine 107.

When, in Step S30, the actual speed of the motorcycle 100 is larger than the threshold, the CPU 52 returns to Step S16 of FIG. 6.

(5) Effects and Advantages of Present Preferred Embodiment

In the present preferred embodiment, when a control failure of the throttle valve 81 occurs, the output of the engine 107 is adjusted such that the motorcycle 100 runs with a negative target acceleration. Also, the transmission 5 is shifted down in steps as the speed of the motorcycle 100 decreases. This prevents discontinuous variations of the speed during the deceleration of the motorcycle 100. This enables smoother deceleration of the motorcycle 100.

Also, in this preferred embodiment, when a control failure of the throttle valve 81 occurs, the output of the engine 107 is adjusted such that the acceleration of the motorcycle 100 decreases to a target acceleration while continuously varying during the deceleration starting time. Thus, the deceleration of the motorcycle 100 can be made gradually larger, making it possible to smoothly start the deceleration of the motorcycle 100 without causing a shock, even when a control failure occurs during acceleration of the motorcycle 100.

Also, the deceleration starting time is determined on the basis of the acceleration of the motorcycle 100 at the time of occurrence of the control failure. Specifically, the deceleration starting time is set longer as the acceleration of the motorcycle 100 at the time of occurrence of the control failure is larger. Setting the deceleration starting time in this way allows the deceleration of the motorcycle 100 to be smoothly started irrespective of the value of the acceleration at the time of an occurrence of the control failure.

Also, the acceleration of the motorcycle 100 is maintained at the target acceleration until the speed achieves a previously set first reference speed. This allows the motorcycle 100 to be smoothly decelerated.

When the speed is decreased to the first reference speed, the output of the engine 107 is adjusted such that the acceleration of the motorcycle 100 rises to zero while continuously varying. In this case, the deceleration of the motorcycle 100 is gradually decreased, so that the driver will not feel acceleration when the acceleration of the motorcycle 100 becomes zero. This improves the driving feeling of the motorcycle 100.

Also, in this preferred embodiment, when the driver performs a brake operation after the occurrence of a control failure of the throttle valve 81, the target acceleration is corrected according to the amount of the brake operation. This prevents the reduction of the engine brake power even when the driver performed the brake operation during the deceleration control of the motorcycle 100. The driving feeling of the motorcycle 100 is improved as a result.

(6) Other Preferred Embodiments (a) Other Examples of Target Acceleration

The target acceleration maybe set such that the absolute value of the initial value of the target acceleration (FIG. 5) is larger than the absolute value of the reference acceleration (FIG. 5).

Also, the target acceleration may be set in the range of about −2 m/sec² to about −4 m/sec², for example.

(b) Other Examples of Motorcycle

In the preferred embodiment above, the shift pedal 112 is preferably arranged so that the driver can make the shifting operation, but a shift switch may be provided to detect the shifting operation by the driver. In this case, the driver can easily perform the shift change of the transmission 5 by operating the shift switch. The shift switch may be provided on the handle 105, for example.

Also, the preferred embodiment above has illustrated the motorcycle 100 as an example of the vehicle, but other types of vehicles, such as three-wheeled motor cars and four-wheeled motor cars, may be used.

(c) Other Examples of Speed Change Control System

The preferred embodiment above has illustrated the semi-automatic speed change control system 200 that automatically performs the shift change of the transmission 5 on the basis of a shifting operation by the driver, but the present invention is applicable also to completely automatic speed change control systems.

In such completely automatic speed change control systems, for example, the up-shifting control and down-shifting control may be started on the basis of torque calculated from a torque map.

(7) Correspondences between Elements in claim s and Elements of Preferred Embodiments In the following paragraph, non-limiting examples of correspondences between various elements recited in the claims below and those described above with respect to various preferred embodiments of the present invention are explained.

In the preferred embodiments described above, the throttle sensor SE2 is an example of a first detector, the fuel injectors 9 and spark plugs 10 are examples of a combustion condition adjuster, the shift actuator 7 and the shift mechanism 6 are examples of a shift mechanism, the CPU 52 is an example of a controller, the deceleration starting time is an example of a first time period, the deceleration ending time is an example of a second time period, the clutch actuator 4 is an example of a clutch operating mechanism, the brake sensor SE5 is an example of a second detector, the given time in Step S21 of FIG. 7 is an example of a third time period, the spark plugs 10 are examples of an ignition device, and the rear wheel 116 is an example of a drive wheel.

Various other elements having configurations or functions described in the claims can be also used as various elements recited in the claims.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A control system for a motorcycle having an engine, an electronically-controlled throttle valve, and a transmission, the control system comprising:
   a first detector arranged to detect a control failure of the electronically-controlled throttle valve;
   a combustion condition adjuster arranged to adjust a combustion condition of a mixture in the engine;
   a shift mechanism arranged to shift a gear position of the transmission; and
   a controller arranged to perform control such that, when the control failure of the throttle valve is detected by the first detector, the controller controls the combustion condition adjuster to adjust the combustion condition of the mixture and also controls the shift mechanism to perform a shift change of the transmission such that the vehicle runs with a previously set negative target acceleration.

2. The control system according to claim 1, wherein the controller is arranged to control the shift mechanism such that the transmission is shifted down in steps according to a reduction of the speed of the vehicle.

3. The control system according to claim 1, wherein the controller is arranged to control the combustion condition adjuster such that the acceleration of the vehicle continuously varies from the acceleration of the vehicle at the time of detection of the control failure to the target acceleration.

4. The control system according to claim 3, wherein the controller is arranged to control the combustion condition adjuster such that the acceleration of the vehicle decreases to the target acceleration in a predetermined time period, and the predetermined time period is determined based on the acceleration of the vehicle at the time of detection of the control failure.

5. The control system according to claim 1, wherein the controller is arranged to control the combustion condition adjuster such that the acceleration of the vehicle continuously varies from the target acceleration to zero when the speed of the vehicle has decreased to a previously set first reference speed.

6. The control system according to claim 5, wherein the controller is arranged to control the combustion condition adjuster such that the acceleration of the vehicle becomes zero and the speed of the vehicle becomes a previously set second reference speed in a previously set time period.

7. The control system according to claim 6, wherein the vehicle further comprises a clutch, and
   the control system includes a clutch operating mechanism arranged to disengage and engage the clutch, and a second detector arranged to detect a brake operation by a driver, and wherein the controller is arranged to control the clutch operating mechanism such that the clutch is disengaged when a brake operation by the driver is detected by the second detector after the speed of the vehicle has decreased to a previously set threshold.

8. The control system according to claim 7, wherein the controller is arranged to control the clutch operating mechanism such that the clutch is disengaged when a condition in which the speed of the vehicle is continued at or below the threshold for a previously set time period.

9. The control system according to claim 1, wherein the combustion condition adjuster includes a fuel injection device arranged to supply fuel to the engine.

10. The control system according to claim 1, wherein the combustion condition adjuster includes an ignition device arranged to ignite the mixture.

11. The control system according to claim 1, wherein the first detector is arranged to detect the control failure by detecting an opening of the electronically-controlled throttle valve.

12. A motorcycle comprising:
   a drive wheel;
   an engine;
   an electronically-controlled throttle valve arranged to adjust an amount of air supplied to the engine;
   a transmission arranged to transmit torque generated by the engine to the drive wheel; and
   a control system including:
      a first detector arranged to detect a control failure of the electronically-controlled throttle valve;
      a combustion condition adjuster arranged to adjust a combustion condition of a mixture in the engine;
      a shift mechanism arranged to shift a gear position of the transmission; and
      a controller arranged to perform control such that, when the control failure of the throttle valve is detected by the first detector, the controller controls the combustion condition adjuster to adjust the combustion condition of the mixture and also controls the shift mechanism to perform a shift change of the transmission such that the vehicle runs with a previously set negative target acceleration.

13. The vehicle according to claim 12, wherein the controller is arranged to control the shift mechanism such that the transmission is shifted down in steps according to a reduction of the speed of the vehicle.

14. The vehicle according to claim 12, wherein the controller is arranged to control the combustion condition adjuster such that the acceleration of the vehicle continuously varies from the acceleration of the vehicle at the time of detection of the control failure to the target acceleration.

15. The vehicle according to claim 14, wherein the controller is arranged to control the combustion condition adjuster such that the acceleration of the vehicle decreases to the target acceleration in a predetermined time period, and the predetermined time period is determined based on the acceleration of the vehicle at the time of detection of the control failure.

16. The vehicle according to claim 12, wherein the controller is arranged to control the combustion condition adjuster such that the acceleration of the vehicle continuously varies from the target acceleration to zero when the speed of the vehicle has decreased to a previously set first reference speed.

17. The vehicle according to claim 16, wherein the controller is arranged to control the combustion condition adjuster such that the acceleration of the vehicle becomes zero and the speed of the vehicle becomes a previously set second reference speed in a previously set time period.

18. The vehicle according to claim 17, wherein the vehicle further comprises a clutch, and the control system includes a clutch operating mechanism arranged to disengage and engage the clutch, and a second detector arranged to detect a brake operation by a driver, and wherein the controller is arranged to control the clutch operating mechanism such that the clutch is disengaged when a brake operation by the driver is detected by the second detector after the speed of the vehicle has decreased to a previously set threshold.

19. The vehicle according to claim 18, wherein the controller is arranged to control the clutch operating mechanism such that the clutch is disengaged when a condition in which the speed of the vehicle is continued at or below the threshold for a previously set time period.

20. The vehicle according to claim 12, wherein the combustion condition adjuster includes a fuel injection device arranged to supply fuel to the engine and the combustion condition adjuster includes an ignition device arranged to ignite the mixture.

21. The vehicle according to claim 12, wherein the first detector is arranged to detect the control failure by detecting an opening of the electronically-controlled throttle valve.

* * * * *

UNITED STATES PATENT AND TRADEMARK OFFICE
CERTIFICATE OF CORRECTION

| | |
|---|---|
| PATENT NO. | : 8,260,527 B2 |
| APPLICATION NO. | : 12/550429 |
| DATED | : September 4, 2012 |
| INVENTOR(S) | : Katsuhiro Arai |

It is certified that error appears in the above-identified patent and that said Letters Patent is hereby corrected as shown below:

On the Title Page:

Item (54) and Column 1, line 1 the title of the invention should read as follows:

CONTROL SYSTEM AND VEHICLE

Column 15, Claim 1, line 1 should read as follows:

A control system for a vehicle having an engine, an

Column 16, Claim 12, line 1 should read as follows:

A vehicle comprising:

Signed and Sealed this
Twentieth Day of November, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,260,527 B2 | Page 1 of 1 |
| APPLICATION NO. | : 12/550429 | |
| DATED | : September 4, 2012 | |
| INVENTOR(S) | : Katsuhiro Arai | |

It is certified that error appears in the above-identified patent and that said Letters Patent is hereby corrected as shown below:

On the Title Page:

Item (54) and Column 1, line 1 the title of the invention should read as follows:

CONTROL SYSTEM AND VEHICLE

Column 15, line 29 (Claim 1, line 1) should read as follows:

A control system for a vehicle having an engine, an

Column 16, line 30 (Claim 12, line 1) should read as follows:

A vehicle comprising:

This certificate supersedes the Certificate of Correction issued November 20, 2012.

Signed and Sealed this
First Day of January, 2013

David J. Kappos
*Director of the United States Patent and Trademark Office*